Figure 4:
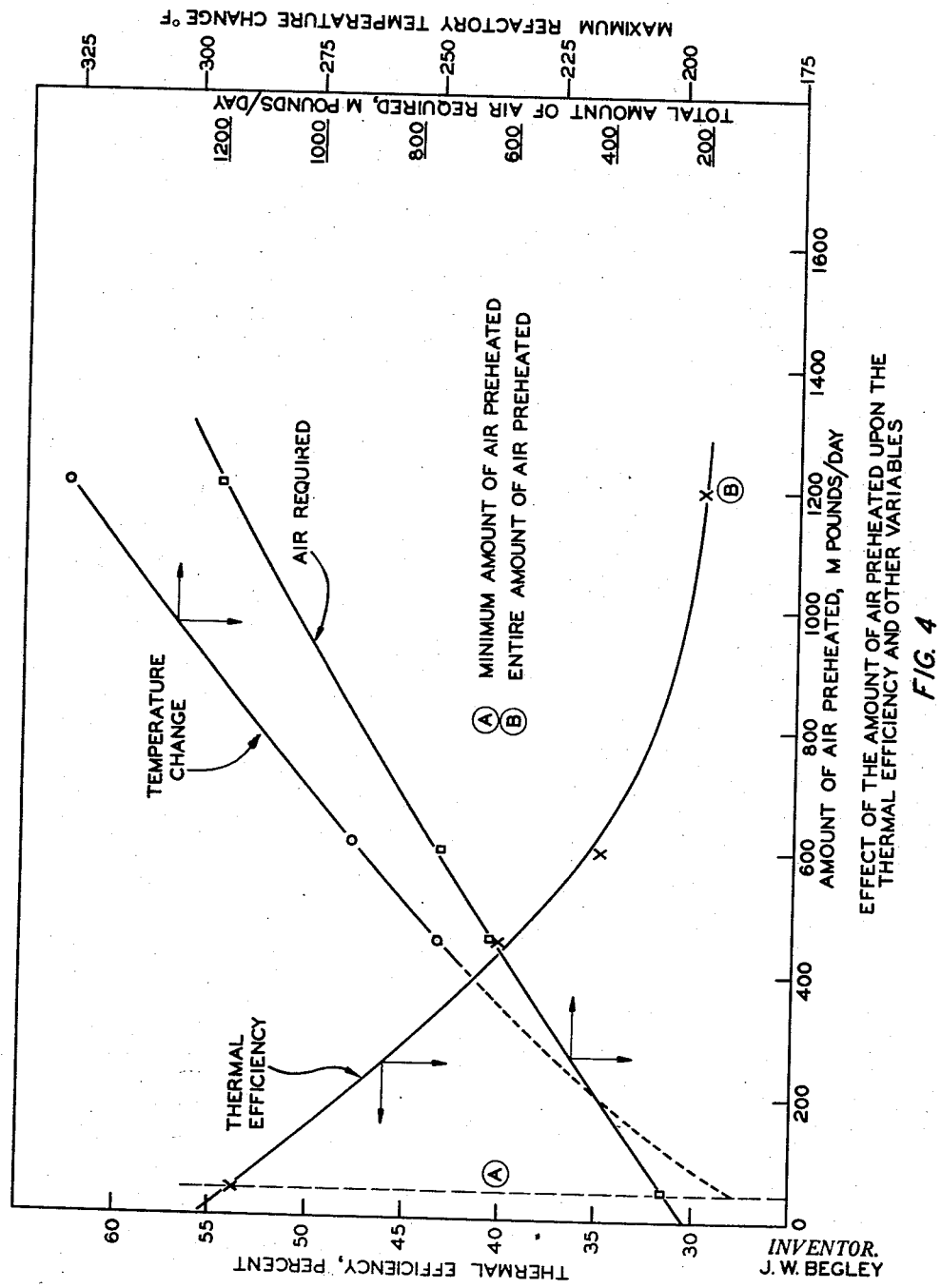

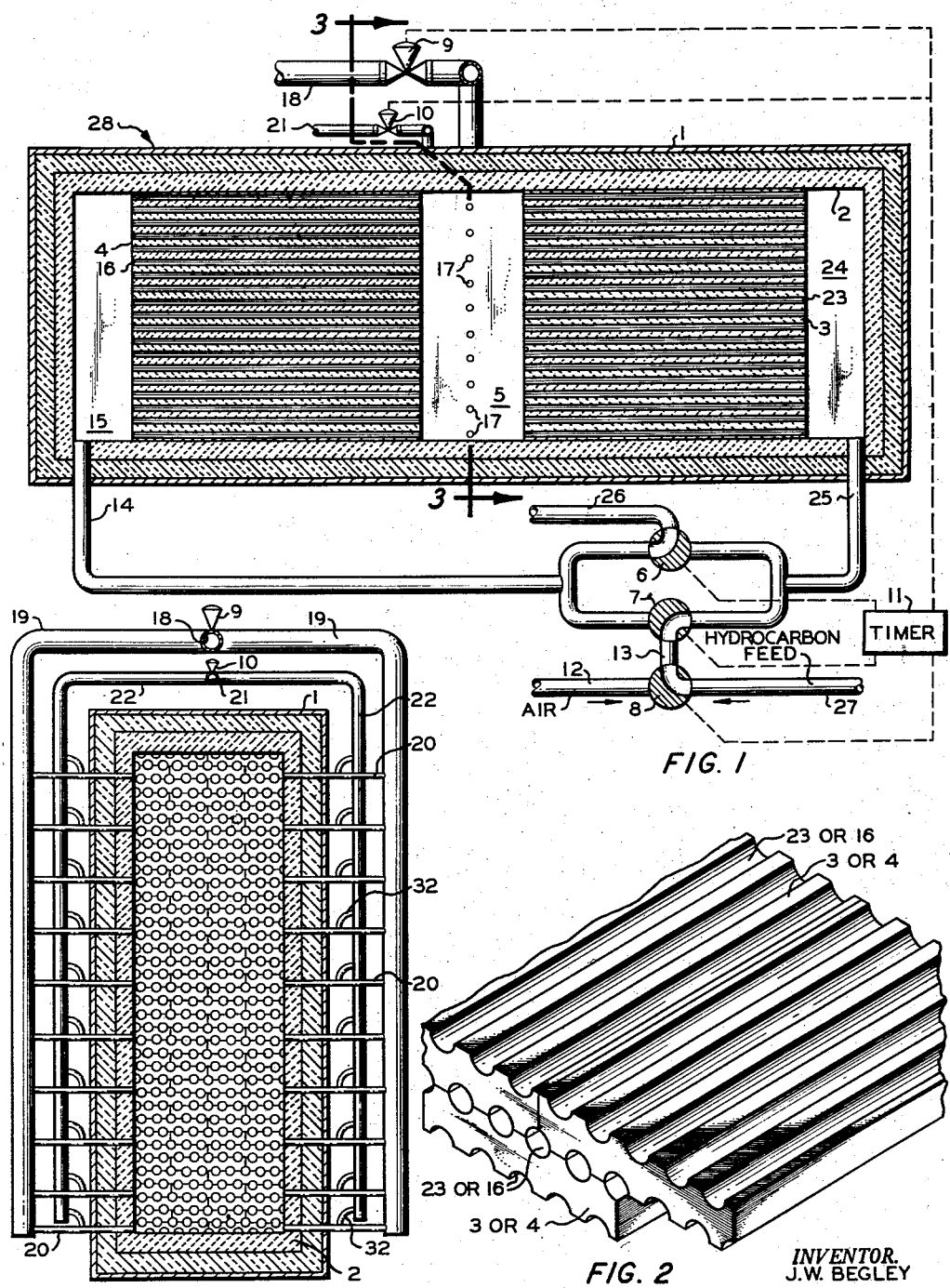

United States Patent Office 2,857,443
Patented Oct. 21, 1958

2,857,443

METHOD OF OPERATING A REGENERATIVE FURNACE FOR CHEMICAL CONVERSIONS

John W. Begley, Ann Arbor, Mich., assignor to Phillips Petroleum Company, a corporation of Delaware Application July 22, 1955, Serial No. 523,704

8 Claims. (Cl. 260—679)

This invention relates to chemical conversions. In one aspect the invention relates to a process for effecting high temperature chemical conversions in heat accumulating zones, for example, refractory checkerworks.

An important aspect of the invention is related to the high temperature endothermic conversion of hydrocarbons in a zone of a regenerative furnace usually in the vapor or gaseous phase in which only a part of the combustion supporting gas is preheated in a heat accumulator zone or refractory checkerwork and a part of said combustion-supporting gas is introduced into a combustion mixture zone in said furnace without being preheated, thus increasing the throughput possible and the thermal efficiency in an operation effected in a reversing regenerative furnace having at least two heat accumulator zones and at least one combustion mixture zone, in which operation alternately air is preheated in a zone, and admixed with a fuel in a combustion zone, and the resulting hot combustion gases are used to preheat a further zone, and then the said zones thus prepared are used to heat, convert, and to quench a material such as a hydrocarbon gas or vapor. In one embodiment of the invention, said part of the gas not preheated is introduced directly into the combustion mixture zone with the fuel gas.

In regenerative furnaces, a stream of air and fuel gas is burned in, or hot combustion products are passed through, a refractory checkerwork, thereby heating it to a high temperature. After the hot gases have passed through a checkerwork for a time sufficient to heat it to a desired temperature, the flow of combustion gases is terminated, and thereafter a fluid material to be thermally treated is passed through the heated checkerwork to bring the material to the desired conversion temperature and to maintain it at a desired temperature range for a length of time sufficient to accomplish the desired conversion.

In a particularly useful furnace of the type here discussed which is utilized for the endothermic conversion of hydrocarbons, notably for the cracking of one or more hydrocarbons, such as methane, ethane, propane, or butane, or heavier hydrocarbons, principally in the gaseous phase, to produce unsaturated hydrocarbons, such as acetylene or ethylene, a zone containing a refractory material, for example an elongated checkerwork, is provided at each end of an intermediate combustion mixture zone, for example a combustion chamber. Combustion supporting gas is passed in one direction through one of the checkerworks (which after one cycle of heating contains a substantial amount of heat at an elevated temperature) while a fuel is introduced into the combustion chamber. Fuel gas and air mixture thus produced is burned and products of combustion thus produced are passed through a downstream checkerwork to heat said checkerwork to prepare it to receive the hydrocarbon to be preheated and partially cracked or otherwise converted therein.

When this checkerwork has attained a sufficiently high temperature, the flow of air and fuel is stopped, and the material to be cracked or otherwise converted passes in the opposite direction through the just heated checkerwork, the combustion mixture chamber, and finally through the now cooler checkerwork previously employed to preheat the combustion supporting gas. Thus, the hydrocarbon to be converted is first preheated to a conversion temperature range, converted substantially at said temperature range, and finally the conversion product mixture thus obtained is quenched or cooled to a desired temperature, during its flow through the apparatus.

After a timed conversion period, the flow of materials to be converted is stopped, and combustion-supporting gas is again passed into the apparatus but in a direction opposite to that of its first introduction, that is the gas is now passed into the checkerwork which has just been employed to heat the hydrocarbon to be converted. At the same time, fuel gas is introduced into the combustion chamber to mix with the air and to form a combustible mixture which is burned in said chamber producing hot gases which are passed into a checkerwork section downstream of the combustion chamber thus heating said last-mentioned checkerwork. When the last-mentioned checkerwork has reached a sufficiently high temperature, the feed to be converted is passed through the heated checkerwork, the combustion zone and finally through the other checkerwork, as before, to preheat, convert or crack the same and to quench the resulting product mixture.

In the consideration of the operation of an apparatus such as just described, I have encountered certain problems. Thus, there is a limit to which the temperature can be raised and/or lowered without unduly thermally stressing the refractory or other apparatus construction material which may be employed. Thus, it has been found that there is a limit to the amount of heat which may be imparted to the combustion chamber and principally to the checkerwork to which the combustion gases are passed from the combustion chamber. Also, upon passing air for combustion purposes through a checkerwork which has just been employed to quench converted hydrocarbons, it has been found that there is experienced too much cooling in the sense that not only is the heat of quench of the converted hydrocarbon removed from the checkerwork but also the refractory of the checkerwork is cooled to a temperature substantially below that to which it can be cooled without unduly stressing it thermally. There is also a limit to the rate of temperature change to which the refractories can be subjected without undue thermal stress. Thus, for any size apparatus the throughput of hydrocarbon to be converted is limited by the factors just discussed. Another limiting factor is the pressure drop encountered when, with a certain apparatus, flow of required quantities of hot combustion gases for raising to a conversion temperature quantities of hydrocarbon considerably in excess of the capacity of said apparatus, when preheating all the air, is attempted. Furthermore, another problem results when the quantity of air put through preheat in a checkerwork is increased to provide the necessary combustion gases at a temperature required for converting an increased quantity of hydrocarbon, as described, employing a desired combustion or firing temperature. Thus, it has been found that the thermal efficiency is considerably decreased when the air input to the checkerwork is increased. This, it has been found, is due to the fact that the amount of heat extracted by the air is greater than that put into the refractory of the checkerwork when the hydrocarbon conversion products are quenched therein. Thus, during heating of the checkerwork with combustion gases lost heat must be replaced by burning an increased quantity of fuel. Since the temperature of the combustion or firing is desirably maintained substantially constant at an optimum level for the apparatus, it follows that the combustion-supporting gas rate must be increased during the combustion cycle. These and other problems, then, are required to be solved for such an apparatus having fixed physical characteristics, and for an operation effected therein, in which operation there are alternately practiced two cycles, one cycle in which in a first zone a combustion-supporting medium is preheated, then passed into a combustion mixture zone from which hot combustion gases, produced by burning of a fuel, are passed into another zone to preheat the same for an ensuing conversion at an elevated temperature and another cycle in which a material is passed into said another zone to preheat it and at least partially convert it, then through said combustion zone to complete the desired conversion of said material and then converted material is passed into said first zone to quench said material to a desired lower temperature, and in which each ensuing alternate conversion cycle is effected by flow of material to be converted through the apparatus in the opposite direction to the last.

According to the present invention, there is provided an improved method for the conversion of a fluid in a regenerative furnace of the general character just described, i. e., a furnace in which a combustion mixture chamber or zone is located intermediate refractory checkerworks or heat accumulator zones, in each of which alternately a conversion is endothermically effected by passing said fluid through a first refractory checkerwork or zone, a combustion mixture chamber or zone, and thereafter through another refractory checkerwork or zone, in a cyclic operation, such as previously described, wherein, as stated, endothermic conversion cycles are alternated with exothermic heating cycles as heretofore described, which comprises preheating in said first zone only a portion, preferably a minimum portion, of the combustion air required, the minimum portion being that required to remove the hydrocarbon quench heat and passing another portion of the required combustion air to said combustion zone without passing it through said first zone. Ordinarily, a predetermined ratio of preheated air to air not preheated is employed, although it is also possible to vary this ratio during a combustion cycle as will be understood.

Operation according to the present invention permits a substantially increased quantity of fluid or material or hydrocarbon to be converted in an apparatus of given size without encountering the problems set out herein and problems related to them. Apparatus of a smaller size can be designed in the light of this invention to handle the same charge rate as previously could be handled by prior art apparatus and methods; or existing apparatus can be modified to handle a greater throughput. Further, in view of the decreased thermal stresses realized when operating according to the concepts of the invention, cheaper refractories can be employed in the furnace construction.

The advantages of my process which are obtained by preheating only a portion of the combustion-supporting gas, contrary to prior art methods, and introducing the other portion of the combustion-supporting gas into the combustion mixture zone into which the fuel gas is also introduced, are further apparent from that which follows.

At the outset among the important advantages of my process are included greater furnace capacity, greater thermal efficiency, decreased pressure drop, and a substantial reduction in thermal shock or strain on the refractories, which last result is of great practical importance.

Other advantages as well as aspects and objects of the invention are apparent from a study of the disclosure, the drawings, and the appended claims.

My process is applicable not only to an endothermic hydrocarbon conversion cyclically alternated with a period of exothermic combustion to accumulate heat in a heat accumulator zone, but also to the endothermic conversion of any material cyclically alternated with the exothermic reaction of a first fluid with a second fluid. In such a case a portion of a first fluid reactant is introduced into the heat accumulator zone, e. g., a refractory checkerwork for preheating while a second reactant fluid and another portion of the first reactant fluid are introduced into an intermediate zone, in a manner analogous to the introduction of a combustion-supporting fluid and a fuel gas as described hereinbefore. The two reactant fluids react exothermically in the intermediate zone, which, instead of being termed a combustion mixture zone or chamber, is termed a reaction zone or chamber. Thus, an exothermic chemical reaction between the fluids occurs in the reaction mixture zone thus furnishing heat to that zone and the downstream checkerwork.

In the interest of simplicity and clarification, the invention will be hereafter described in one important aspect involving thermal conversion of hydrocarbons in the gaseous phase.

The invention is particularly applicable to the thermal cracking of streams containing methane, ethane, propane, butane, or isobutane, or to streams comprising mixtures of two or more of these compounds, to produce unsaturated hydrocarbons, and in particular to produce acetylene or ethylene, or mixtures of both.

In Figures 1, 2 and 3 are shown one form of apparatus in which the process of the invention can be practiced. Figure 1 is an elevation, partially in section, of a suitable regenerative furnace for use in accordance with this invention. Figure 2 is an isometric view of two tiles placed together. Figure 3 is a partial cross-section of Figure 1, taken at 3—3. Figure 4 graphically illustrates some advantages of the inveniton.

Referring to the drawing, a regenerative furnace 28 comprises a steel shell 1, insulating refractory 2, and heat accumulating refractory checkerworks 3 and 4 separated by a combustion mixture chamber 5. The heat exchanging refractory checkerworks are made up of tiles. Figure 2 shows two of the tiles stacked so that the semicircular grooves in the upper and lower surfaces of the tiles form circular tubes across the depth of the tile. The grooves on the tile are staggered so that the tube centers formed by the stacks of the tiles are about equally spaced. Figure 3 shows the arrangement of the tubes formed by the tile checkerwork, and fuel and air manifolds. Communicating with combustion mixture chamber 5 through ports 17 are fluid introduction means 20 which in turn communicate with manifold conduit 19 and manifold conduit 22 via auxiliary lines 32. Conduits 19 and 22 contain flow control means, 9 and 10, respectively, which means can be motor valves; and communicate with conduits 18 and 21, respectively.

Plenum chambers 15 and 24, connected to either end of the furnace, provides means for introducing materials into the furnace. Conduits 12 and 27 are connected to a three-way valve which is in turn connected to conduit 13 which communicates at its other end with three-way valve 7, which is connected in turn with conduits 14 and 25. Conduits 14 and 25 communicate with plenum chambers 15 and 24, respectively. Conduits 14 and 25 are also selectively connected with effluent conduit 26 by three-way valve 6. Timer 11 is operatively connected to flow control means 9 and 10 and to three-way valves 6, 7, and 8, thereby providing means for sequentially changing the cycles of operation of the regenerative furnace.

Operation of the process of my invention will be described as it is carried out in the form of apparatus shown in Figure 1, and as applied to the regenerative cracking of hydrocarbons:

I. COMBUSTION CYCLE (FLOW LEFT TO RIGHT)

Valves 6, 7 and 8 are turned opposite to position shown in Figure 1. Valves 9 and 10 are open, these changes being effected by timer 11. Air to be preheated flows through line 12, valve 8, line 13, valve 7 and line 14 to plenum chamber 15, thence through hot refractory tubes 16 in refractory mass 4 to combustion mixture chamber 5. The preheated air supplements fuel and air entering ports 17 by way of line 18, valve 9, manifold 19 and lines 20, in the case of fuel, and by way of line 21, valve 10 manifold 22 and auxiliary lines 32 connecting manifold 22 with lines 20, in the case of air. The hot combustion gases pass through tubes 23 in refractory mass 3 and heat the said mass 3 to reaction temperature. The cool combustion gases leave by way of plenum chamber 24, line 25, valve 6 and line 26 to utilization as fuel or disposal as desired.

II. MAKE CYCLE (FLOW RIGHT TO LEFT)

At the beginning of this cycle, the timer operates to close valves 9 and 10 and to reverse plug valves 6, 7 and 8 (position shown in Figure 1). Hydrocarbon feed, together with steam if desired, enters line 27 and passes by way of valve 8, line 13, valve 7 and line 25 to plenum chamber 24. The hydrocarbon feed passes through hot refractory mass 3 by way of tubes 23 wherein it is heated to reaction temperature and cracked. The cracking continues until the reactants have passed through combustion mixture zone 5 and into tubes 16 of refractory mass 4. The refractory mass 4, which was considerably cooled by preheating the air used in the combustion cycle now quenches the products of the cracking reaction which continue on out of refractory mass 4 by way of plenum chamber 15, line 14, valve 6, and line 26 to product recovery means (not shown).

III. COMBUSTION CYCLE (FLOW RIGHT TO LEFT)

At the beginning of this cycle, the timer operates to reverse plug valve 8 and to open the valves 9 and 10. Air enters line 12 and passes by way of valve 8, line 13, valve 7, line 25 and plenum chamber 24 to hot refractory mass 3 which it traverses by way of tubes 23. The air is preheated in the refractories 3 and cools the refractory for its subsequent use as a quench means in a succeeding cycle. The preheated air meets combustion gases entering by way of ports 17 in combustion mixture chamber 5. The products of combustion pass through and heat refractory mass 4 by way of tubes 16 and thence proceed to utilization or disposal means by way of plenum chamber 15, line 14, valve 6 and line 26.

IV. MAKE CYCLE (FLOW LEFT TO RIGHT)

The timer operates to reverse valves 6, 7 and 8 and to close valves 9 and 10. Hydrocarbon feed, and steam if desired, enters by way of line 27, valve 8, line 13, valve 7, line 14, and plenum chamber 15. The feed is cracked in hot refractory mass 4 by flowing through tubes 16, thence through combustion mixture chamber 5 to tubes 23 in refractory mass 3 wherein the products are quenched. The quenched products pass by way of plenum chamber 24, line 25, valve 6 and line 26 to product recovery. The timer operates to reverse the plug valves 6, 7 and 8 and open valves 9 and 10 and the series of cycles is repeated.

In certain furnaces of this type, useful for the production of acetylene, the conversion zone is 9" wide and 20" high, total furnace length being 9' 4½", with a combustion chamber length 9". In a larger scale furnace, suitable dimensions, are a cross-section of 25" by 80" for the conversion zone. The proper dimensions, of course, vary with the exact throughput of the furnace, the type of reactants used, the necessary temperature and pressure, and various other operating features, as will be understood.

Example

Results of calculations showing the advantages of the invention when cracking ethane to produce acetylene in a furnace of the type shown in Figures 1 and 3 are presented in Table 1 and Figure 4. The cross-section of the furnace considered in this study is 27" wide by 90". The surface area of the tubes formed by the checkerwork was 506 square feet per foot of length. The cross-sectional area of the tubes was 3.95 square feet which is 23.4 percent of the total cross-sectional area. The length of each refractory checkerwork tube section was 10.5 ft., and the length of the combustion zone was 2 feet. It will be noted that a constant feet rate of ethane was employed in each example.

At a constant firing temperature and exit combustion gas temperature, the air preheat temperature and the exit hydrocarbon temperature will vary as the amount of air to be preheated is varied. Thus, for one case the amount of air preheated was varied and the total amount of air required at each air rate was determined. These results were extrapolated to the point where the entire amount of air was preheated. The results are presented in Table 1. The results in Table 1 are for a case when the exit combustion gas temperature was 800° F.

Some of the results in Table 1 are plotted in Figure 4. As shown in Figure 4 the efficiency decreases as the amount of air preheated is increased. The maximum efficiency is obtained when the minimum amount of air is preheated. The minimum amount of air is defined as that amount required to remove the hydrocarbon quench heat. The thermal efficiency decreased from 54 percent to 30 percent when the amount of air preheated was increased from the minimum to the amount required when the entire amount of air was preheated. This may seem to be anomalous but it can be explained. As the amount of air preheated is increased above the minimum amount, the amount of heat transferred from the refractory of either section to the air (depending on which end the air enters the furnace) is increased but the heat of quench is not increased significantly. During the combustion cycle this heat must be replaced by the heat from the combustion gases. Since the firing temperature was at the upper limit of 2800° F. and was constant for the results presented in Figure 4, the firing rate had to be increased to supply the heat removed by the air. Thus, the efficiency was decreased. The increased heat losses were due to the increased amount of combustion gases leaving the furnace at the constant temperature of 800 in the cases considered here.

Other results presented in Figure 4 are the total air required and the maximum temperature change in the refractory when the amount of air preheated is varied. For this case when the entire amount of air was preheated, 1,200,000 pounds of air per day were required. The pressure drop across the furnace would prohibit operation at the foregoing ethane feed rate when the entire amount of air is preheated. However, the capacity would be greater than the 72,450 pounds per day if the minimum amount of air were preheated and additional air introduced at the midde of the furnace with the fuel.

It is to be noted that if the amount of air preheated is between the minimum and the amount required when all of the air is preheated, the ratio of the air to fuel introduced at the center of the furnace is below the theoretical air-fuel ratio in most cases (see Table 1). Because of the high temperatures presented at these air-fuel ratios, an outside combustion chamber, mentioned hereafter, is not now preferred.

TABLE 1.—EFFECT OF THE AMOUNT OF AIR PREHEATED ON THE EFFICIENCY AND OTHER VARIABLES

| | | | | |
|---|---|---|---|---|
| Ethane Feed Rate, lb./day | 72,500 | 72,450 | 72,450 | 72,450 |
| Conversion, Percent | 93.0 | 93.0 | 92.4 | 92.4 |
| Length of Each Refractory Section, Feed | 10.5 | 10.5 | 10.5 | 10.5 |
| Firing Temperature, °F | 2,800 | 2,800 | 2,800 | 2,800 |
| Exit Combustion Gas Temperature, °F | 800 | 800 | 800 | 800 |
| Exit Hydrocarbon Temperature, °F | 800 | 792 | 772 | 728 |
| Amount of Air Preheated, lb./day | 1 44,600 | 450,000 | 600,000 | 1,200,000 |
| Amount of Air With Fuel, lb./day | 221,000 | 172,000 | 132,500 | 0 |
| Fuel Rate, lb./day | 9,240 | 12,100 | 12,440 | 16,870 |
| Weight of Combustion Gases, lb./day | 274,840 | 634,100 | 744,940 | 1,216,870 |
| Heat Losses, MM B.t.u./day | 99.505 | 155.345 | 173.435 | 253.663 |
| Air Preheat Temperature, °F | 2,060 | 2,048 | 2,040 | 1,900 |
| Thermal Efficiency, Percent | 54.0 | 40.3 | 35.2 | 30.1 |
| Maximum Rate of Refractory Temperature Change, °F./Min | 190 | 248 | 266 | 326 |

1 This amount of air must be preheated in order to maintain the same temperature level in the furnace.

From these examples, it will be seen that, as the amount of air to be preheated is increased, thermal efficiency decreases, the thermal stresses on the refractory increase, and the pressure drop increases; further, the fuel and air required increase. These factors plus the decrease in efficiency as the amount of air preheated is increased indicate advantages for preheating only the minimum amount of air. The worst case from all standpoints mentioned, it will be seen, is where all of the air is preheated. The increase in thermal stresses on the refractory when preheating all the air increases the chance of spalling or breaking up of the refractory.

It will be obvious to those skilled in the art in possession of the concepts of this invention that calculation need not be resorted to in order to determine the quantity of fuel to be employed in the combustion cycle when employing a given ratio of preheated air to air not preheated, a given charge rate of material to be endothermically converted, and a given firing temperature, and where a given maximum temperature of the quenched endothermically converted product material is chosen. Thus, it can be seen, that the firing temperature will depend upon the ratio of the total amount of air to the amount of fuel. As will be readily understood, no calculation is necessary since data can be taken from the plant and the air to fuel ratio can be adjusted to obtain a particular firing temperature. The total amount of fuel, then, to be employed depends, of course, upon the optimum amount of heat to be applied to the material to be endothermically converted. This, of course, can also be determined by trial and error operation. Thus, at one particular fuel rate, after the unit is lined out, data can be taken on the effluent endothermically converted gases produced in the make cycle. Then different fuel rates can be employed using the same rate of material to be converted on the make cycle and analyses of the product gases be again determined. From these data, then, the optimum desired fuel rate can be chosen.

In the now preferred embodiment when effecting an endothermic reaction of a hydrocarbon, according to the invention, a minimum amount of air is preheated, i. e., the amount of air which must be preheated by passing through the refractory section in order to remove enough heat from the refractory so that the refractory will be effective to quench the product endothermically converted gases to a desired temperature. This minimum amount of air can also be determined, as will be understood, by plant operation. Assuming that one is operating above this minimum amount of air, the ratio of air not preheated to air preheated can be increased, still keeping the same fuel rate and ratio of total air to fuel. As will be understood by those in possession of the teachings and concepts of the invention, one will now have to decrease the ratio total air to fuel in order to obtain the same firing temperature; once this is done, it will be seen that the amount of fuel must now also be reduced at the same firing temperature because of the increased thermal efficiency as previously discussed in connection with the results shown in Figure 4. As before, the total amount of fuel necessary at the new ratios will be determined by plant data. This process of increasing the ratio of air not preheated to preheated air and lining the unit out at the new conditions is repeated until one arrives at the point where the minimum amount of air is being used, i. e., where the exit endothermically converted gases are being quenched just to the desired temperature on the lined out operation. Thus, any further reduction in the amount of air preheated will result in the exit converted gases not being quenched to as low a temperature as desired.

As will be understood, the preferred numerical ratio of combustion-supporting gas not preheated to combustion-supporting gas preheated depends upon many factors including the particular conversion, the particular physical dimensions of the furnace, etc. However, in the endothermic conversion of hydrocarbons to produce acetylene or to produce a mixture containing acetylene and ethylene, a preferred ratio is usually in the range from 3:1 to 7:1. Also, in such operation, the ratio of total combustion-supporting gas to fuel depends upon a large number of factors, but usually the ratio of total combustion-supporting gas used compared to the amount of combustion-supporting gas theoretically required for complete combustion of the fuel, will be within the range of 1:1 to 2.5:1.

As stated, the process and apparatus of this invention are especially adapted for the production of unsaturated hydrocarbons, especially acetylene, ethylene and mixtures of acetylene and ethylene, by thermally cracking light hydrocarbons hereinbefore mentioned. The reaction temperatures for such a process will vary in the approximate range from 1250° F. to 3200° F. In the acetylene process, the reaction temperature is preferably maintained between about 2200° F. and 2600° F., still more preferably between about 2400° F. and 2600° F. When mixed acetylene and ethylene streams are desired, the preferred temperature range is between about 1700° F. and 2200° F.; and in the ethylene process, between about 1250° F. and 1700° F. The reaction times for the several processes are in the following approximate ranges: for acetylene, between 0.001 and 0.2 second; for a mixture of acetylene and ethylene, between 0.01 and 0.2 second; and for ethylene, between 0.01 and 2 seconds. From this consideration of reaction temperatures and reaction times, it is apparent that the reaction times vary inversely with the reaction temperatures; i. e., the higher the reaction temperature, the shorter the reaction time for a given reaction.

In addition to the light hydrocarbons previously mentioned, the process and apparatus of this invention are also well adapted for use in processes for the cracking of hydrocarbons which are normally liquid. While it is within the scope of the invention to vaporize the liquid hydrocarbon feed prior to introduction into the furnace, it is a feature of this invention that the liquid hydrocarbon feed may be introduced directly into the furnace without pretreating or preheating. Combustion-supporting gases which can be used include not only air but also oxygen and oxygen-enriched air. Any suitable fuel, preferably a clean-burning fuel, can be used in the combustion step of this invention. Gaseous or liquid hydrocarbons are preferably used as fuels, and process off-gases from the process of this invention or other processes can be advantageously employed. When using a liquid hydrocarbon, the fuel is introduced into the furnace in vaporized form.

It will be understood by those skilled in the art that the temperature of the effluent converted gases leaving the cooling or quenching checkerwork will depend upon many inter-related factors. Some of these factors include, of course, the particular conversion being effected, the quench temperature level necessary to arrest the particular reaction as desired, the portion and amount of fluid passed through the checkerwork for preheat in the preceding exothermic reaction cycle, the physical structure of the furnace, etc. In the production of acetylene according to my process, it is generally preferred that the effluent product gases exit at a temperature below 1800° F., exit temperatures in the range from 600 to 1500° F., being more usually employed.

In a now preferred embodiment of my invention, when converting hydrocarbons in an endothermic conversion, pressures in the furnace are held between the range of 20 inches mercury vacuum and 7 pounds per square inch gauge pressure. Pressures employed in general in the process of my invention will, of course, depend upon the nature of the reaction being effected and upon the characteristics of available materials of construction.

In the furnace shown in Figure 1, the fuel and the portion of combustion-supporting gas which is not preheated are shown as being introduced into combustion mixture zone 5 as a plurality of mixed streams through lines of such size that flame propagation is prevented. However, it is within the scope of the invention to mix the two gases before introduction into the combustion mixture zone in an external chamber or chambers communicating wtih the combustion mixture zone, in which chamber or chambers all or a portion of the fuel is burned. It is also within the scope of the invention to introduce the fuel and the portion of the combustion-supporting gas separately to the furnace or combustion mixture zone.

In the operation of regenerative furnaces to effect an endothermic conversion, it is often economically desirable to employ a purge after each combustion cycle or after each make cycle, or both. Thus, steam or another inert gas can be passed for a short period through the entire furnace in order to clear the furnace of the gases left therein at the end of the previous cycle. Such expedients are, of course, within the scope of this invention.

Herein and in the claims wherever combustion zone or combustion mixture zone is recited it will be understood by those skilled in the art in possession of this disclosure that the zone may have any desired shape or configuration, or may have one or more than one fluid or fuel inlets thereto. In its operation one or more than one of such inlets can be employed; and even where such inlets are not located equi-distant between the ends of the furnace or of the zone, obviously at different times in different cycles differently located inlets can be employed.

The present process is applicable to apparatus and methods such as are disclosed in my copending applications Serial No. 462,836, filed October 18, 1954 and its divisional application Serial No. 700,057, filed December 2, 1957, and Serial No. 471,816, filed November 29, 1954, now Patent No. 2,785,212; copending applications of R. R. Goins and J. W. Begley Serial No. 464,112, filed October 22, 1952, now Patent No. 2,792,437, and Serial No. 434,955, filed June 7, 1954; such apparatus and methods being modified according to the teachings of the present invention.

As will be evident to those skilled in the art, various modifications of this invention can be made or followed in the light of the foregoing disclosure and discussion without departing from the spirit or scope of the disclosure or from the scope of the claims.

I claim:

1. In the heating step of the operation of a regenerative furnace having a first heat accumulator zone, another heat accumulator zone, and a reaction mixture zone intermediate said heat accumulator zones, in which step a first fluid is passed into and through said first heat accumulator zone, said intermediate reaction mixture zone, and is withdrawn through said another heat accumulator zone and in which a second fluid is introduced directly into the said reaction mixture zone, the improvement which comprises introducing another portion of said first fluid into the reaction mixture zone without passing it through said first heat accumulator zone, and in which process at least a portion of the two said fluids react with each other in an exothermic reaction, the improvement resulting in an increased thermal efficiency in the operation of said heating step.

2. A process which comprises passing a first fluid through a first heat accumulator zone, a reaction mixture zone, and finally through another heat accumulator zone, introducing a second fluid and another portion of said first fluid directly into said reaction mixture zone, reacting at least a portion of the two fluids with each other in an exothermic reaction and thereby accumulating heat in said another heat accumulator zone; interrupting the flow of said first and second fluids, passing a material to be endothermically converted through said another heat accumulator zone, said reaction mixture zone and finally through said first heat accumulator zone, said material being heated, converted in an endothermic conversion, and finally cooled during the flow just recited; interrupting the flow of material to be converted, passing another portion of said first fluid through said another heat accumulator zone, reaction mixture zone, and finally through said first heat accumulator zone, introducing another portion of said second fluid and a still further portion of said first fluid directly into said reaction mixture zone, reacting at least a part of said two fluids just recited with each other in an exothermic reaction and thereby accumulating heat in said first heat accumulator zone; interrupting flow of said first and second fluids, passing another portion of said material to be endothermically converted through said first heat accumulator zone, said reaction mixture zone, and finally through said another heat accumulator zone, said material being heated, converted in an endothermic conversion, and finally cooled during the flow just recited.

3. A process which comprises passing a first fluid through a first refractory checkerwork, then through a combustion mixture zone, and finally through another refractory checkerwork, introducing a second fluid and another portion of said first fluid directly into said combustion mixture zone, reacting at least a portion of the two fluids with each other in an exothermic reaction and thereby heating the said another checkerwork to a desired temperature; interrupting the flow of said first and second fluids, passing a material to be endothermically converted through said another refractory checkerwork, then through said combustion mixture zone and then finally through said first checkerwork, said material being heated, converted in an endothermic conversion, and finally cooled during the flow just recited; interrupting the flow of material to be converted, passing another portion of said first fluid through said another refractory checkerwork, then through said combustion mixture zone, and then finally through said first checkerwork, introducing another portion of said second fluid and a still further portion of said first fluid directly into said combustion mixture zone, reacting at least a part of said two fluids just recited with each other in an exothermic reaction and thereby heating the said first checkerwork to a desired temperature; interrupting flow of said first and second fluids, passing another portion of said material to be endothermically converted through said first checkerwork, then through said combustion mixture zone, and then finally through said another checkerwork, said material being heated, converted in an endothermic conversion, and finally cooled during the flow just recited.

4. The process of claim 3 wherein said first fluid is a combustion-supporting gas, said second fluid is a fuel, and said material to be converted in an endothermic reaction comprises an organic compound.

5. The process of claim 4 wherein said fuel is hydrocarbon, said combustion-supporting gas is selected from the group consisting of air, oxygen-enriched air, and oxygen, and said material is a hydrocarbon.

6. A process for producing a gas comprising acetylene which comprises passing a combustion-supporting gas, selected from the group consisting of air, oxygen-enriched air and oxygen, through a first refractory checkerwork to preheat said gas, then through a combustion mixture zone, and finally through another refractory checkerwork, introducing a fuel and another portion of said gas not preheated into said combustion mixture zone in a predetermined ratio to the amount of combustion-supporting gas being passed through said first checkerwork, burning at least a part of said fuel with a least a part of the combustion-supporting gas, thereby heating the said another checkerwork to a desired temperature, while maintaining a predetermined ratio of the sum of preheated combustion-supporting gas and the combustion-supporting gas not preheated to the said fuel such that said combustion mixture zone and said another checkerwork will be heated to a temperature sufficient to maintain the temperature of the ensuing endothermic conversion within the range from 1700 to 3200° F.; interrupting the flow of said combustion-supporting gas and said fuel, passing hydrocarbon to be cracked in an endothermic conversion through said another refractory checkerwork, then through said combustion mixture zone and then finally through said first checkerwork, said hydrocarbon being heated, at least partially cracked to acetylene, and the product gases containing acetylene cooled, during the flow just recited; interrupting the flow of said hydrocarbon, passing another portion of said combustion-supporting gas through said another refractory checkerwork to preheat said gas, then through said combustion mixture zone, and finally through said first refractory checkerwork, introducing another portion of said fuel and a still further portion of said combustion-supporting gas not preheated into said combustion mixture zone in said predetermined ratio to the amount of combustion-supporting gas being passed through said another checkerwork, burning at least a part of said fuel with at least a part of the combustion-supporting gas, thereby heating said first checkerwork to a desired temperature, while maintaining said predetermined ratio of the sum of preheated combustion-supporting gas and combustion-supporting gas not preheated to said fuel such that said combustion mixture zone and said first checkerwork will be heated to a temperature sufficient to maintain the temperature of the ensuing endothermic conversion within the range from 1700 to 3200° F.; interrupting the flow of said combustion-supporting gas and said fuel, passing another portion of said hydrocarbon to be cracked in an endothermic conversion through said first refractory checkerwork, then through said combustion mixture zone and then finally through said another checkerwork, said hydrocarbon being heated, at least partially cracked to acetylene, and the product gases containing acetylene cooled, during the flow just recited.

7. The process of claim 6 wherein the said hydrocarbon comprises at least one of the group consisting of methane, ethane, propane, butane and isobutane; the combustion-supporting gas is air; the said predetermined ratio of combustion-supporting gas not preheated to combustion-supporting gas being preheated is in the range of 3:1 to 7:1; and the said predetermined ratio of the sum of combustion-supporting gas preheated and combustion-supporting gas not preheated to the amount of said gas required theoretically to burn all of said fuel is in the range from 1:1 to 2.5:1.

8. The process of claim 6 wherein the product gases being cooled are quenched to a maximum desired predetermined temperature, and the minimum amount of combustion-supporting gas is preheated, said minimum amount being defined as the amount of gas which must be preheated by passing through the refractory checkerwork in order to remove just sufficient heat from the refractory such that the refractory will be effective to quench the product gases being cooled, after the said ensuing endothermic conversion, to the said maximum desired predetermined temperature.

References Cited in the file of this patent

UNITED STATES PATENTS

| 2,678,339 | Harris | May 11, 1954 |
| 2,692,819 | Hasche et al. | Oct. 26, 1954 |
| 2,718,534 | Harris | Sept. 20, 1955 |
| 2,733,287 | Schauble et al. | Jan. 31, 1956 |
| 2,751,424 | Hasche | June 19, 1956 |

FOREIGN PATENTS

| 583,851 | Germany | Sept. 13, 1933 |